United States Patent [19]
Robbins et al.

[11] Patent Number: 6,131,694
[45] Date of Patent: Oct. 17, 2000

[54] VERTICAL SEISMIC PROFILING IN A DRILLING TOOL

[75] Inventors: Carl A. Robbins; Eugene J. Linyaev, both of Houston; Robert L. Malloy, Katy; David J. Young, Houston; James R. Birchak, Spring; John Minear; Vimal Shah, both of Houston, all of Tex.

[73] Assignee: Ahlliburton Energy Services, Inc., Houston, Tex.

[21] Appl. No.: 09/388,271

[22] Filed: Sep. 1, 1999

Related U.S. Application Data

[60] Provisional application No. 60/098,972, Sep. 2, 1998.

[51] Int. Cl.[7] ................. G01V 1/40; G01V 1/32
[52] U.S. Cl. ............... 181/105; 181/103; 367/57
[58] Field of Search ................. 181/103, 105, 181/106, 122, 108; 367/57, 73

[56] References Cited

U.S. PATENT DOCUMENTS

| 4,627,036 | 12/1986 | Wyatt | 367/57 |
| 5,400,299 | 3/1995 | Trantham | 181/108 |

*Primary Examiner*—Khanh Dang

[57] ABSTRACT

A vertical seismic profiling system includes seismic receivers for placement on a drillstring and surface seismic sources. One-way checkshot data may thus be measured without tripping the drillstring. A downhole acoustic tool measures the local interval transit time of the formation, and improves the detection of targets ahead of the drill bit. The local interval transit time may be applied to the time of travel from reflections in front of the bit to establish distance to the bit. The down-going wavetrain may be deconvolved with the total up-going wavetrain to extract the nearest reflector and the relative acoustic impedance at the reflector. A synthetic seismogram may also be created based on reflection depth data and corrected with checkshot data.

14 Claims, 8 Drawing Sheets

VERTICAL SEISMIC PROFILING IN A DRILLING TOOL

CROSS-REFERENCE TO RELATED APPLICATIONS

This application relates back to and claims priority to provisional application Ser. No. 60/098,972, filed Sep. 2, 1998 entitled "Vertical Seismic Profiling in a Drilling Tool."

STATEMENT REGARDING FEDERALLY SPONSORED RESEARCH OR DEVELOPMENT

Not Applicable.

BACKGROUND OF THE INVENTION

In drilling a borehole to recover oil from the earth, it is often helpful to turn or steer the downhole drill bit toward or away from subterranean targets. To facilitate this geophysical steering, drillers need to know drill bit location on the surface seismic section. The location of targets ahead of the bit is also required, as well as some warning or indication of drilling hazards such as over-pressured formations or thin, shallow gas intervals. Surface seismic surveys generally include this information, but resolution and depth location is poor because surface seismic surveys are time based (rather than depth based). For example, to determine the depth of a reflection, a speed of sound for the formation must be known. Consequently, these systems require depth calibration to accurately determine locations of target horizons or drilling hazards. Traditionally, this calibration has been provided by either offset well sonic data or wireline checkshot data in the current well. Offset data is often inadequate however due to horizontal variations in stratigraphy between wells. Wireline checkshots require tripping (i.e., removing) the bit out of the hole and are often prohibitively expensive.

During surface seismic surveys, a plurality of seismic sources and seismic receivers are placed on the surface of the earth. The seismic sources are triggered in a predetermined sequence, resulting in the generation of seismic waves. These seismic waves travel downward through the earth until reflected off some underground object or change in rock formation. The reflected seismic waves then travel upward and are detected at the seismic receivers on the surface. One or more clocks at the surface measure the time from generation of the seismic waves at each source to the reception of the seismic waves at each receiver. This gives an indication of the depth of the detected object underground. However, the exact speed of sound for these seismic waves is unknown, and thus, the exact depth of the detected object is also unknown. To more closely measure the exact speed of sound, a "wireline checkshot" may be used to calibrate depth measurements. During a "wireline checkshot," a receiver on a "wireline" is lowered a known distance into an already-drilled borehole. A surface seismic source is then triggered and the time is measured for the seismic wave to travel to the wireline receiver. Because the depth of the wireline receiver is known, an average interval velocity indicating the average speed of the seismic wave can be determined with some degree of accuracy.

Attempts have been made to provide "reverse vertical seismic profiling" while drilling. This approach transposes the downhole location of the receiver with the surface location of the seismic source. These attempts have been based mainly on using the drill bit as a source of a seismic wave, with an array of suitable receivers spread on the surface. These methods, however, work with only specific bit types, and they will not work in highly deviated wells. Also, attempts have been made to generate sources downhole that permit reverse vertical seismic profiling. A source by Klaveness, U.S. Pat. No. 5,438,170 incorporated herein by reference, is akin to a drilling jar and generates large tool modes and tube waves and poor seismic signals. Another known source vibrates the bit with a piezoelectric. It has a very short range and can only be used with downhole receivers. Another drawback is that for formations directly ahead of the bit, downhole sources and receivers cannot distinguish between high-pressure formations and other reflective boundaries. An air gun has also been placed downhole, but requires air lines from the surface. Air guns and water guns are not ideal downhole sources because they are localized sources that create large tube waves, require intrusive pressure systems, and may damage the formation.

SUMMARY OF THE INVENTION

A vertical seismic profiling tool while drilling includes an appropriate source positioned on the surface, and receivers located on a drill string. Surveys may be taken with the drill bit stopped, either when making drill pipe connections or whenever required. Checkshot readings may be made and transmitted through the mud pulse telemetry system to facilitate real time update of the bit position on the seismic section. In addition, distance to and acoustic characteristics of reflectors ahead of the bit may be determined and transmitted via the same mud pulse system. This would enable target location and hazard detection ahead of the bit.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
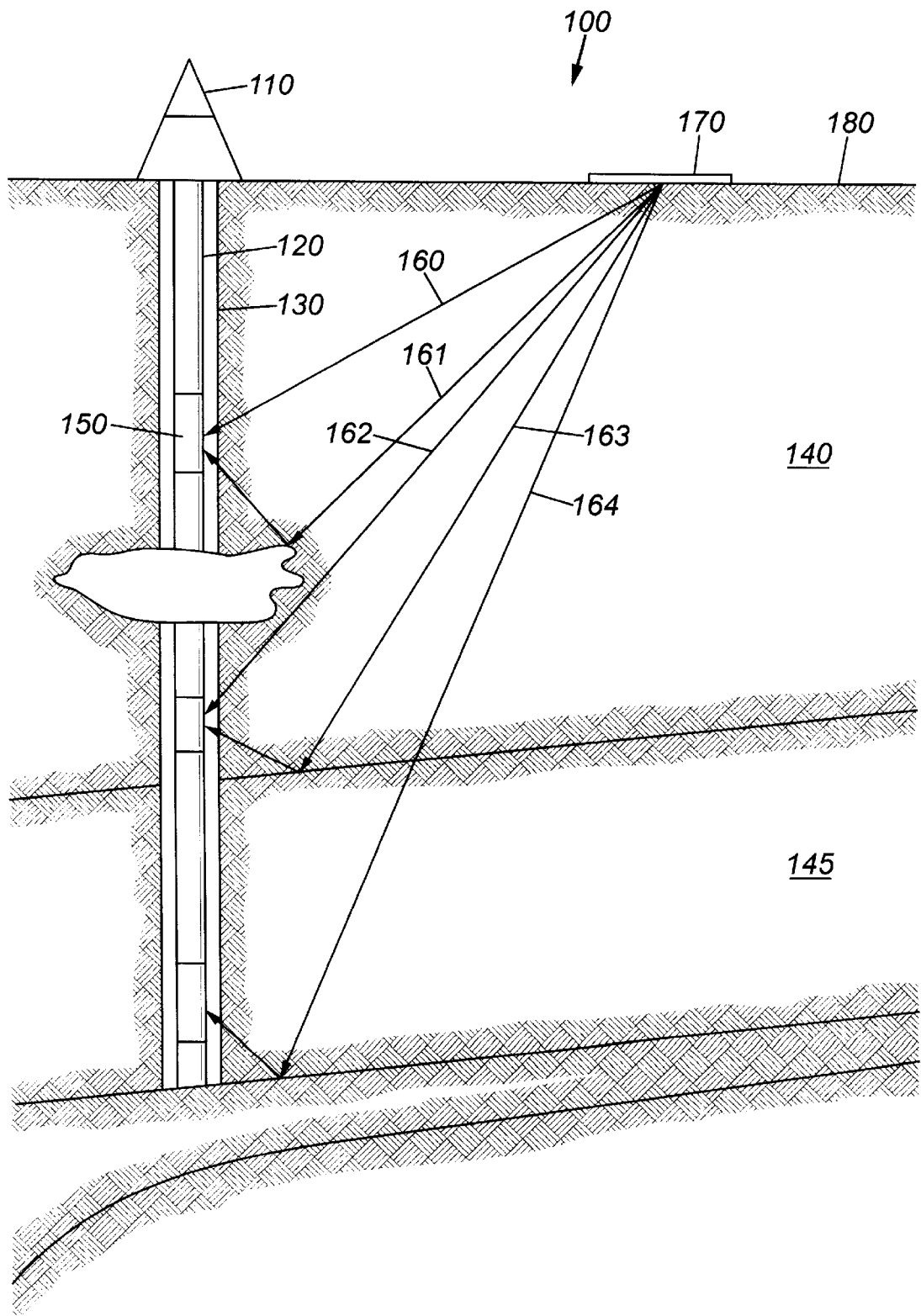
FIG. 1 is a cut-away view of an embodiment of the invention.
Figure 2:
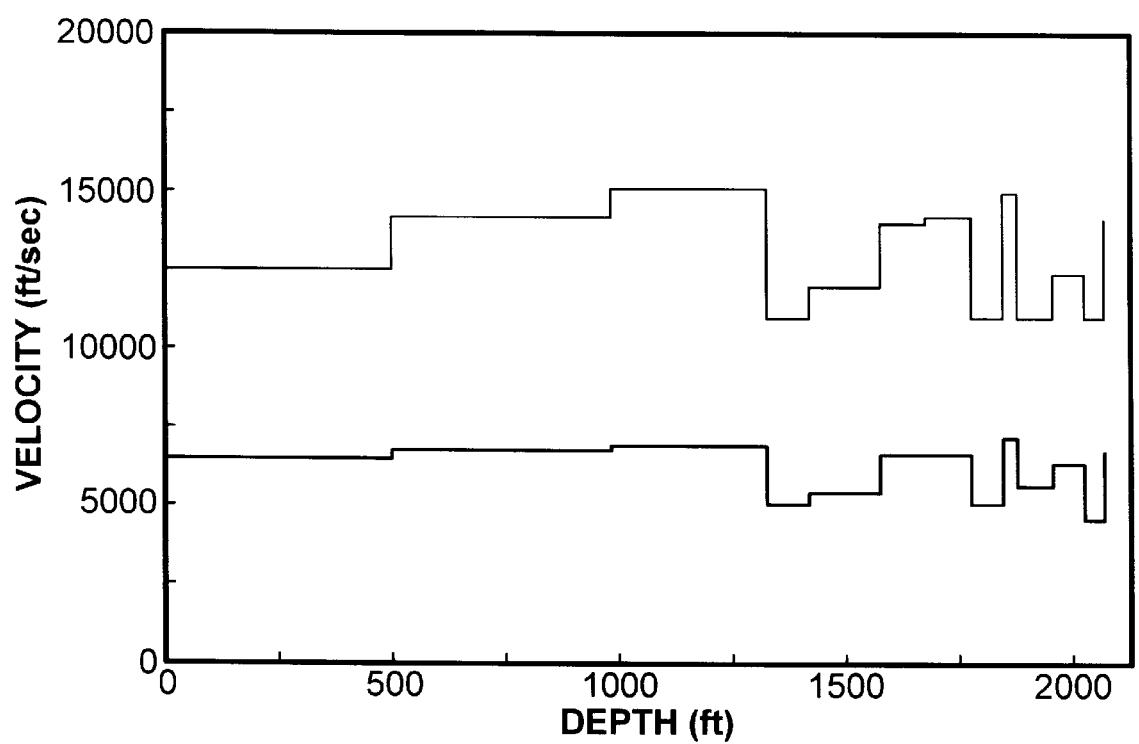
FIG. 2 is a coarse interval transit time log for the well.
Figure 3:
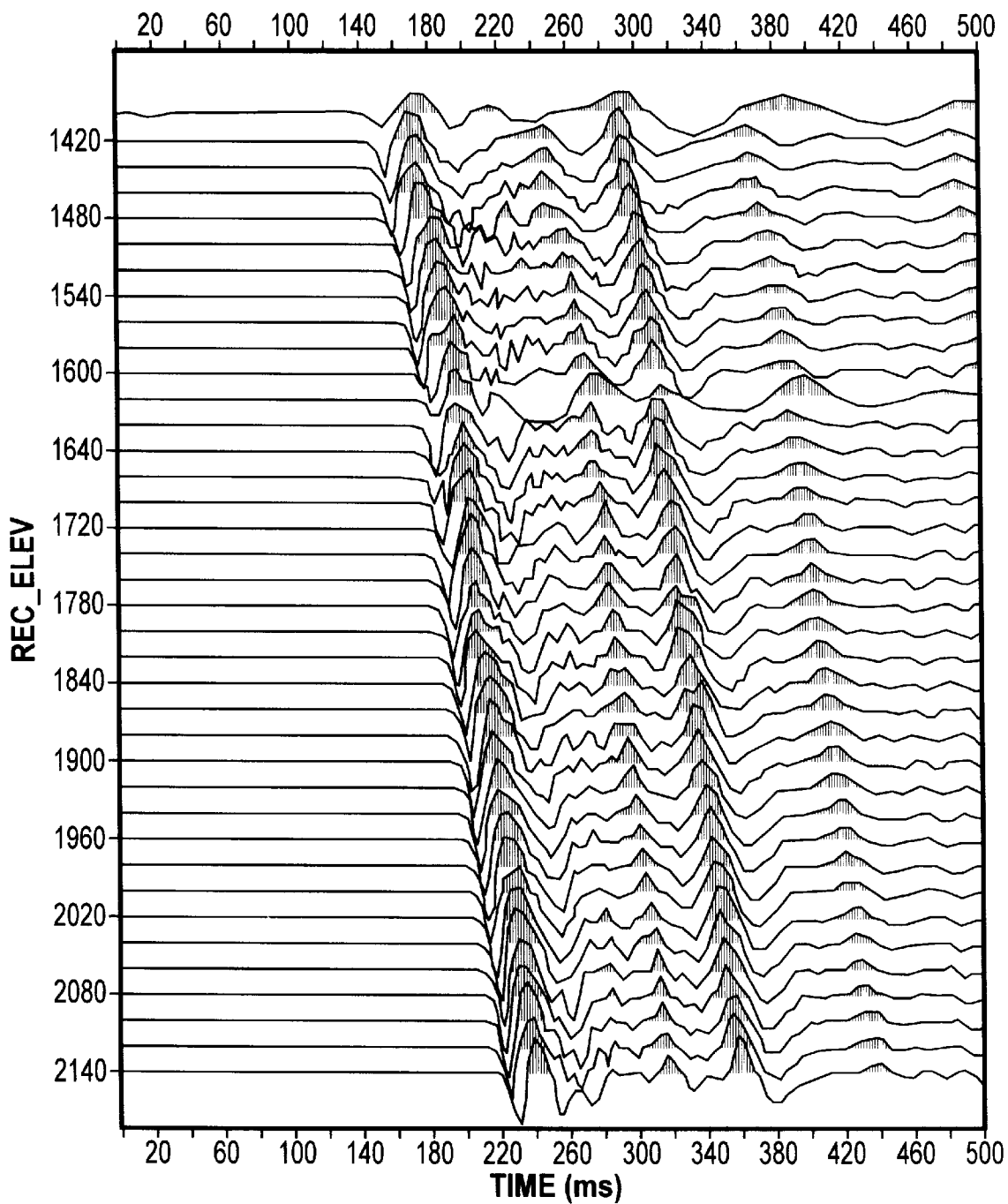
FIG. 3 is a wireline vertical seismic profiling log from the well. The surface air gun was a single 150 cubic inch gun in a 9" deep pit. The waveforms are total raw wave-trains, up-going and down going combined.
Figure 4:
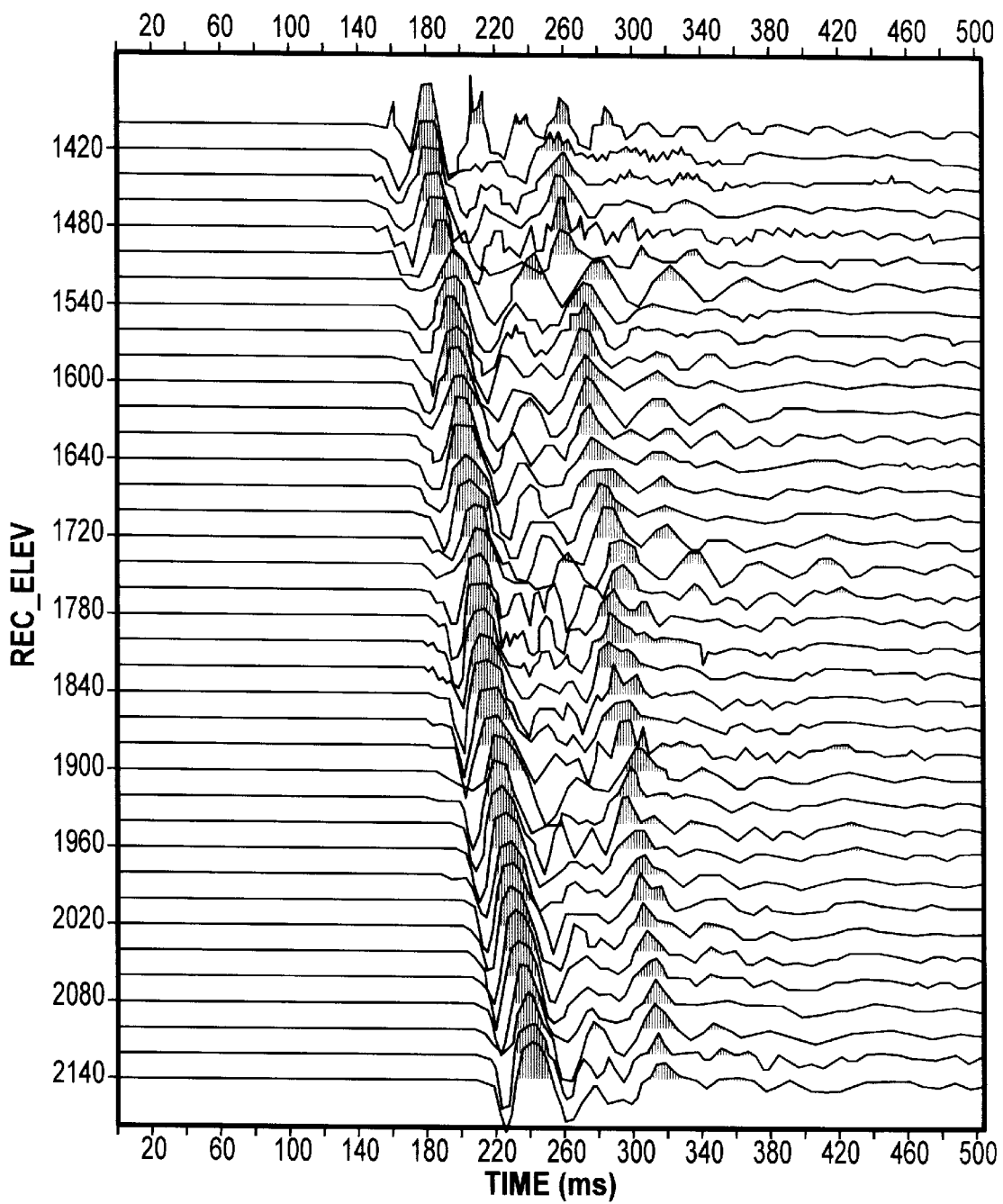
FIG. 4 is LWD vertical seismic profiling data taken with a research LWD tool over the same interval as the wireline tool. The polarity is inverted from the wireline tool, but the first arrival detection is clear.
Figure 5:
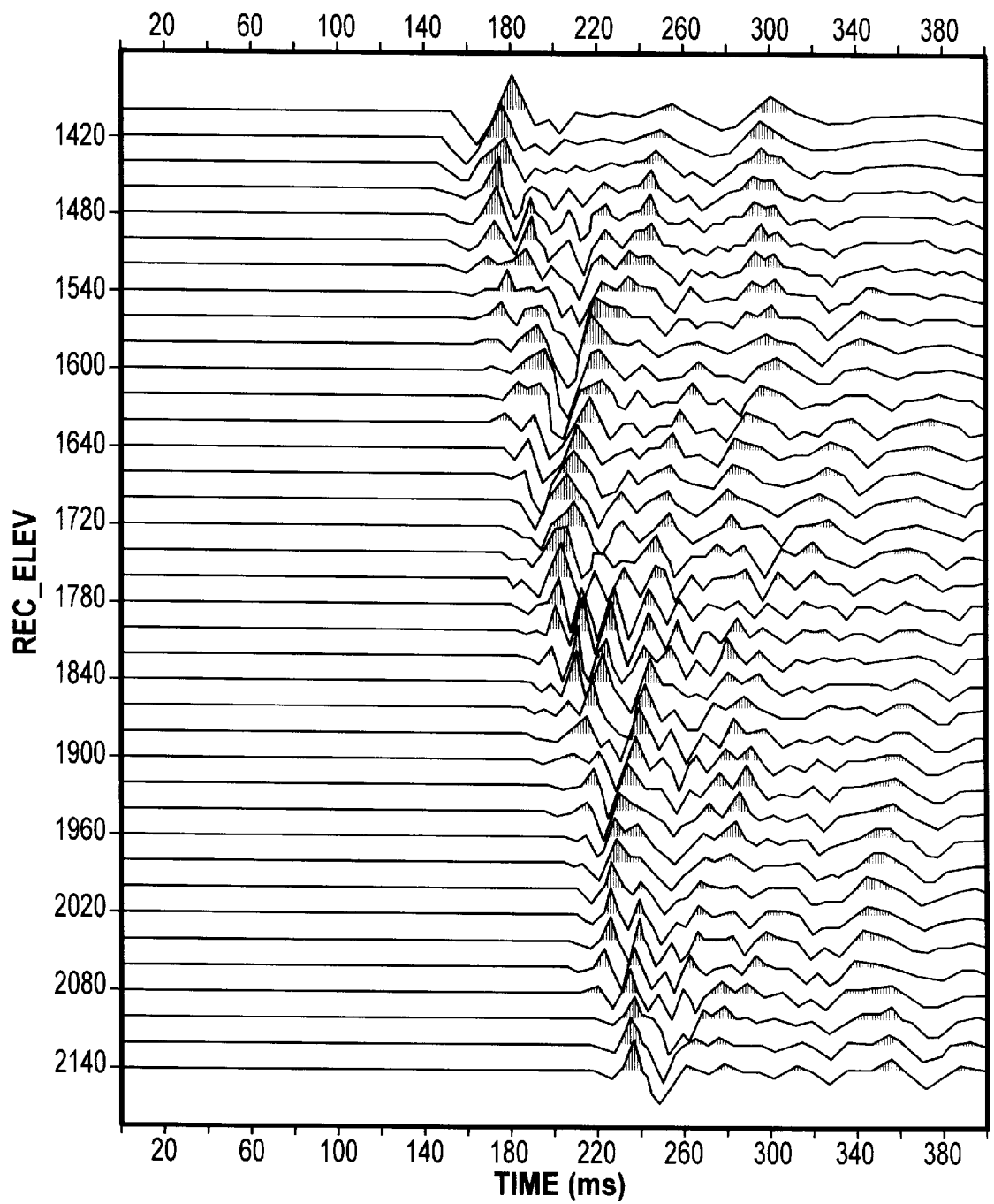
FIG. 5 is the up-going wave-train for the wireline data set. Standard processing was performed to separate up and down going wave-fronts. Several reflectors are clearly evident in the data.
Figure 6:
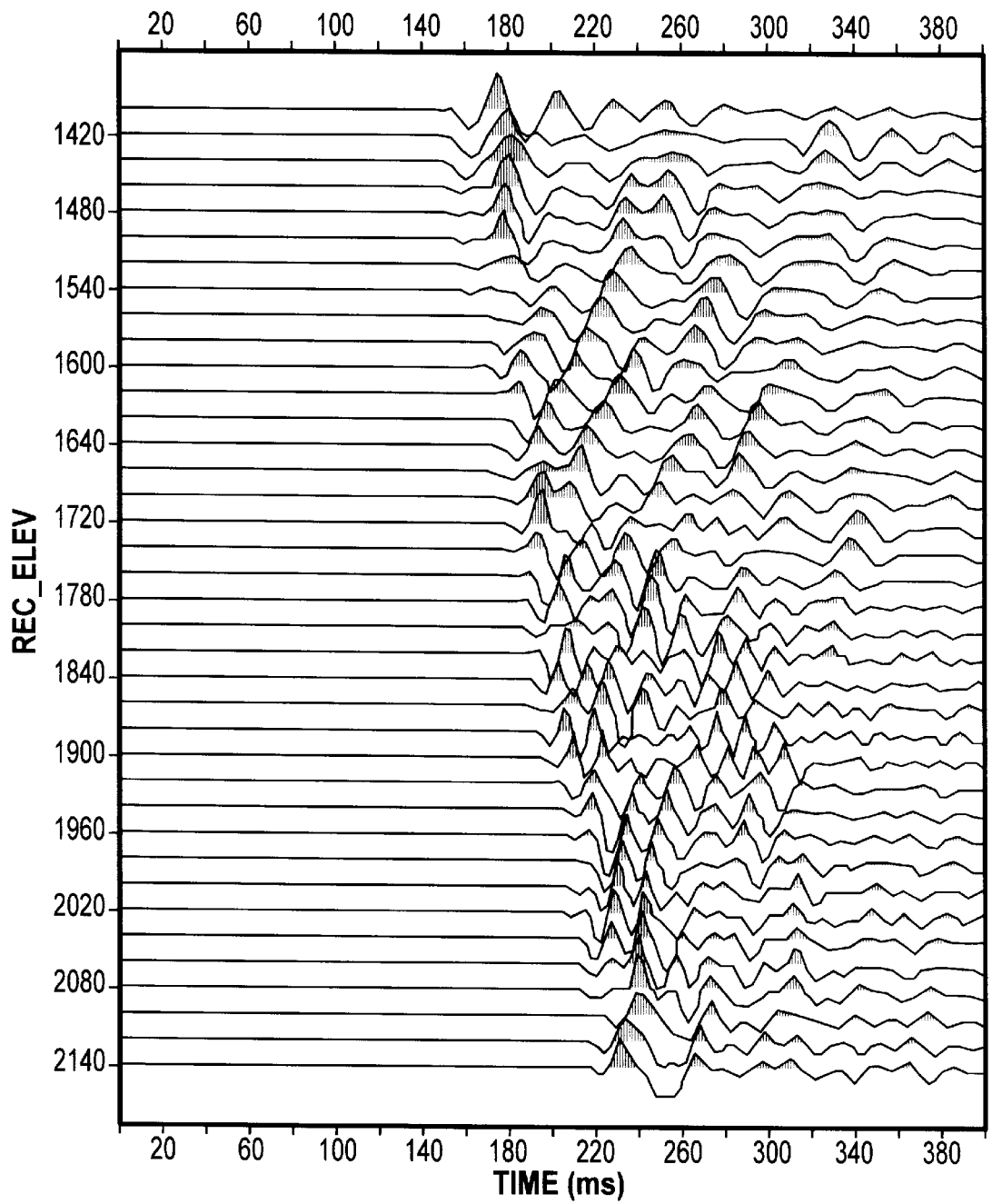
FIG. 6 is the up-going wave-train for the LWD tool. Strong reflections at 1900,1800 and 1600 feet are apparent in the data, and this agrees with the velocity profile.
Figure 7:
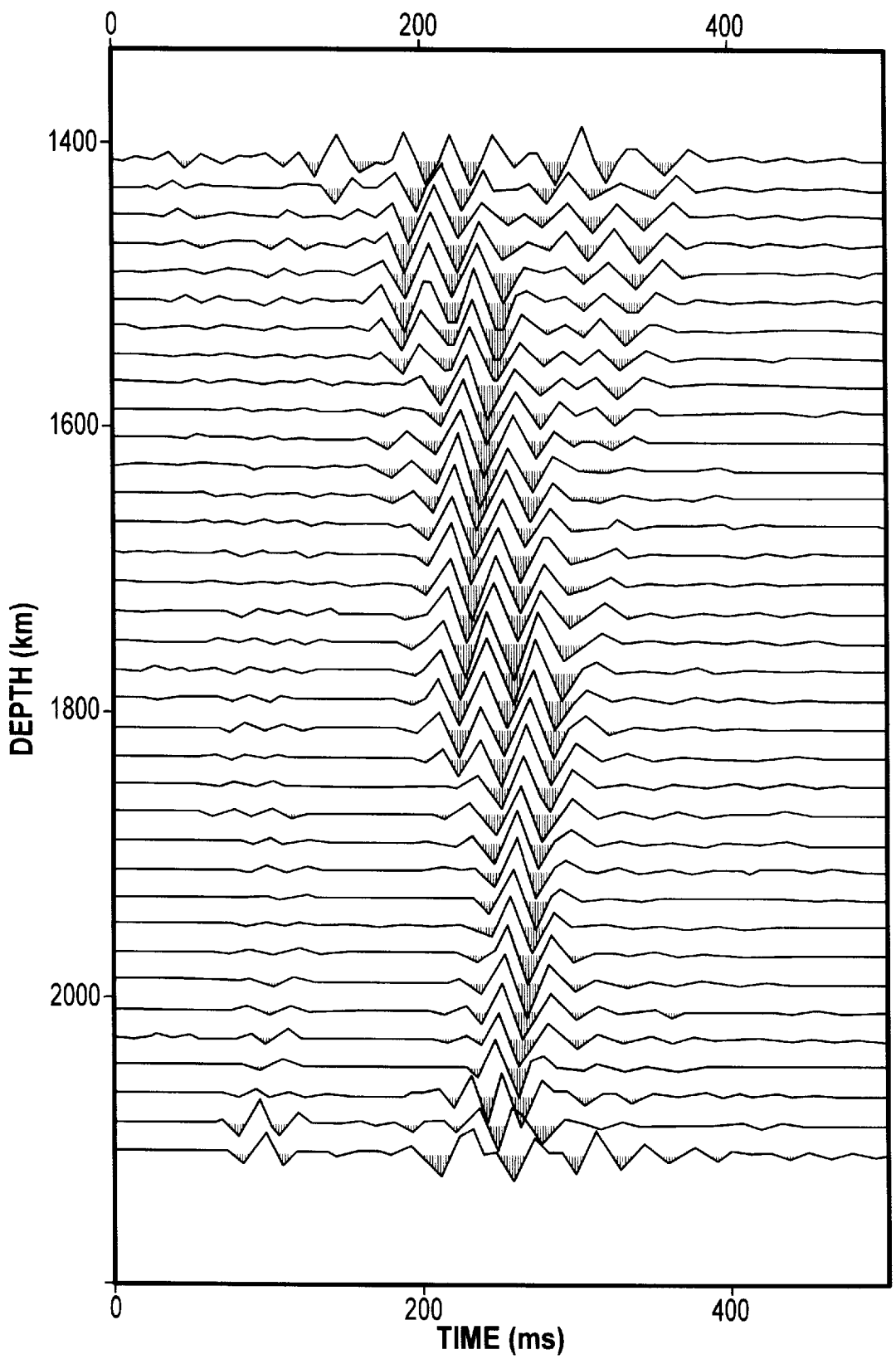
FIG. 7 is a synthetic vertical seismic profiling, at different time scale and depth orientation, provided for comparison. This computed data set was based on ideal Ricker wavelet source function rather than the relatively "ringy" data set of our experimental test, but is useful for identifying reflections at 1900,1800 and 1600 feet.

Referring now to FIG. 1, a system 100 according to the present invention may include a derrick 110 with an attached drillstring 120. A drill bit creates a well bore 130 through the surrounding formation 140, which may also include formation boundaries corresponding to, for example, an overpressurized zone 145. A sonic tool 150 with appropriate seismic receivers is attached to drillstring 120 and receives seismic signals 160 from a seismic source 170, such as an air gun array located on the surface 180. The use of an air gun array is exemplary only, as the system may be either land or marine-based, and is not seismic source-type specific. For example, the system may include a standard surface air gun array, either hung from an offshore platform or located on a service boat or anchored buoy. Control of this array is achieved with standard controllers. The array thus provides a suitable vertical seismic profiling quality source. In a deviated well, the source would be appropriately offset from the rig; for vertical holes, the source could be located on and controlled from the rig. A clock to maintain accurate timing is also uphole.

The downhole section of the system may include a combination of hydrophones and geophones in an auxiliary sub to a sonic tool. The geophone is a 3-axis type. A highly stable real time clock circuit is also included to provide time stamps for the checkshot signals, along with memory and control electronics. A modified sonic tool is appropriate to house the pertinent equipment. Signal conditioners and data modem are in the auxiliary sub. The sub is properly keyed to the bottom hole assembly so that directional data is available when the sub fires. In other words, the standard directional survey also provides orientation information for the 3-axis geophone. Optionally included with the sub is a tandem stabilizer that can be installed to improve tool coupling in near vertical wells. If desired, several detector subs can be scattered throughout the bottomhole assembly and controlled by the sonic tool. This facilitates better detection and resolution of signals of interest, such as direct waves from the surface and reflections.

The preferred embodiment includes a "check shot" determination to establish the average interval velocity from the surface to the downhole receiver array. During this determination, mud flow stops, and the receivers on the drill string go into a listen mode. Whether the mud flow is on or off can be determined by a variety of standard means. A surface seismic source is then triggered, which generates a seismic signal having a frequency on the order of 50 Hz. The seismic signal generated by the surface source is thereafter detected at the downhole receiver array on the drill string. One advantage of the array of downhole receivers is that the downhole components are passive; unlike reverse vertical seismic profiling, there is no possibility of borehole damage due to powerful downhole sources.

If the seismic signal arrives during a predetermined clock interval, it will be processed for first arrival (check shot) information downhole. This typically involves the measurement of the "first break" on the received seismic waveform. The downhole electronics record the time the first break occurred for this received seismic wave based upon the downhole clock. This is also known as providing a "time stamp" for the received signal. The time stamp associated with the first break of the seismic checkshot signal is then transmitted to the surface via any suitable transmission means, typically a mud pulse system. In this way, checkshot information arrives at the surface while the drillstring is in the wellbore, avoiding a need to remove the drillstring to measure the interval transit time of a seismic wave. It is envisioned that a checkshot reading would be taken every 500–1000 feet, although this is not crucial to the invention.

The system at the surface calculates the total travel time from the surface source by monitoring the precise time that the source fired via a suitable trigger detection system and comparing it to the checkshot data. The true vertical depth is corrected for and the interval transit time (i.e. total one way seismic travel time) is then available. Consequently, the real time checkshot values allow the bit position on the seismic section to be updated as drilling progresses.

One difficulty with such an approach, however, is the time drift of the downhole clock. Of course, to make meaningful a time-of-flight measurement of a seismic wave from a surface source to a downhole receiver, the measurement must be accurate. Thus, the downhole clock should be synchronized with the uphole clock to maintain accurate timing. However, a drill bit may be in the borehole for four or five days, with the clock drift on a crystal-based clock being on the order of plus or minus 30 milliseconds per day. When accuracy of within a millisecond is desired, this amount of clock drift is wholly unacceptable. Although methods currently exist to reduce clock drift, such as refrigeration of the clock, these techniques are very expensive and often still are subject to clock drift due to vibration from the downhole drilling. Further, synchronization of clocks at a receiver is either unnecessary (such as when a cable connects the source and receiver) or not feasible for the downhole receiver (such as radio or satellites).

Therefore, the invention preferably includes a method to synchronize the downhole clock with a surface based clock without tripping or removing the drill string from the borehole. Preferably, this synchronization involves transmitting a synchronization signal through the drill string or the casing. The travel time along the drill string or casing to the downhole clock will also be known, based upon the known depth of the clock and the known travel speed through a drill string or casing. Thus, a suitable generation time for the synchronization signal can be selected. For example, a synchronization signal may be generated by a piezo-electric stack or a magneto-strictive device on the surface at a predetermined time. To prevent undue noise, the actual drilling may be paused while the synchronization signal is sent downhole. This synchronization signal can then be detected and processed downhole and used to correct for any clock drift of the downhole clock. As an additional advantage, such an approach would allow the use of a less expensive clock.

This system may also advantageously be used to improve a technique called vertical seismic profiling. In addition, the system can be used to avoid or otherwise take precautionary measures with respect to drilling hazards ahead of the bit. For example, high resolution and an accurately known depth to drilling hazards allows mud weight modification.

Referring again to FIG. 1, seismic sources 170 on the surface are suitable to generate seismic waves 160–164. These seismic waves travel not only directly to the receivers in the sonic 150, but also reflect off targets, transitions, or objects in front of the drill bit. The reflected waves then may travel to the seismic receivers contained in the sonic tool to provide additional information about the underground rock formation in front of the drill bit.

To determine the character of the rock formation in front of the bit, the surface seismic sources are fired approximately every 50 feet of travel by the drill bit. Consequently, the downhole seismic receivers also detect reflected subterranean seismic waves every 50 feet of travel by the drill bit.

An advantage to the embodiment of FIG. 1 is the position of the receivers in the CLSS, which facilitates distinction between up-going and down-going wave trains. Once the up-going wave-train is obtained, a transfer function for the system ahead of the bit can be effectively determined. To obtain the transfer function for the system ahead of the bit, the down going wave-train is deconvolved with the total up-going wave-train. The distance to the nearest reflector and the relative acoustic impedance of that reflector can be extracted from the up-going train with the down going train as the input.

Figure 8:
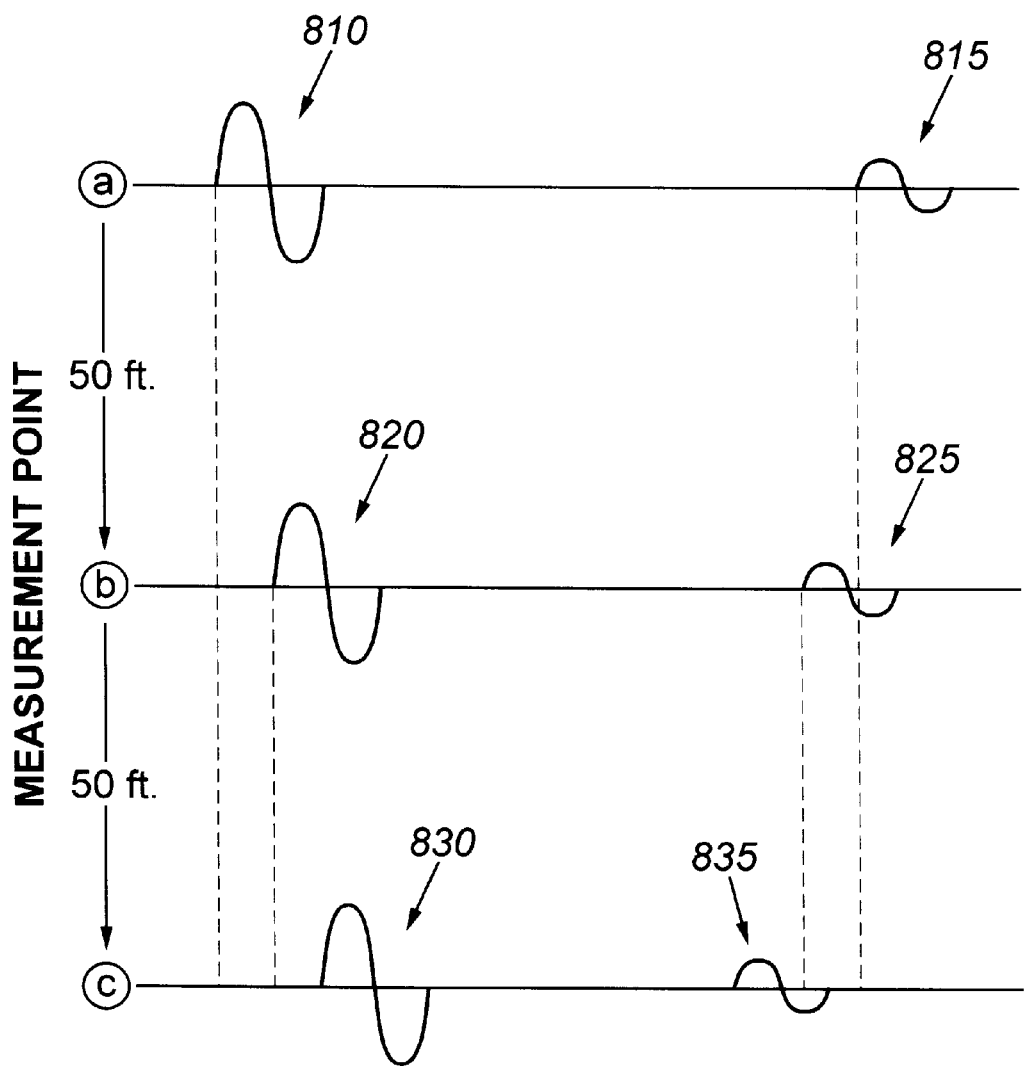
FIG. 8 is a graph showing a received seismic waveform corresponding to three consecutive levels.

FIG. 8 illustrates a series of waveforms that a receiver on a drill string may detect after consecutive shots by a surface seismic source. A first waveform corresponding to wellbore depth "a" includes a first check shot portion 810 and a first reflected portion 815. A second waveform corresponding to wellbore depth "b" includes a second check shot portion 820 and a second reflected portion 825. Second check shot portion 820 is later in time than first check shot portion 810, while second reflected portion 825 is earlier in time than first reflected portion 815. A third waveform corresponding to wellbore depth "c" includes a third check shot portion 830 and a third reflected portion 835. Third check shot portion 830 is later in time than second check shot portion 820, while third reflected portion 835 is earlier in time than third reflected portion 835. As the drill bit moves further away from the surface seismic source and closer to the target from which portions 815, 825, 835 have reflected, the check shot portion occurs later in time and the reflected portion is received relatively earlier in time. In particular, how closely these changes in reception times are to a linear progression can be used to indicate the relative location of the underground target with respect to the drill bit.

One hurdle to determining the distance to various targets underground based on the measured time differences is correlating the time differences to a specific distance to a target. That is, even with the advantages explained above, the exact location of hazards and reflectors in front of the drill bit is nonetheless difficult to determine because it must be based on an inaccurate speed of sound measurement. While the times of checkshot generation and reception can yield a speed of sound measurement over the total distance between a surface seismic source and receiver on the drill string, this measurement is subject to error from clock drift as well as checkshot travel through a formation or series of formations that have different speeds of sound than the formation in front of the bit.

A solution to this difficulty is use of a sonic tool together with the receiver array on the drillstring. The sonic tool downhole may be used to measure the local interval transit time and, hence, the speed of sound for the formation close to the bit. So although the sonic tool measurement of the interval transit time near the drill bit may not be particularly suited for the long distances involved in a checkshot measurement, it is very well suited for determining the distance to a target in front of the bit. Thus, use of a sonic tool in combination with seismic receivers on the drill string provides for a higher resolution measurement of targets ahead of the drill bit. Further, the measurement of the sonic tool is not subject to error because of clock drift.

Data obtained by the sonic tool can also be used to improve further the vertical seismic profiling. For example, the measurement of the formation surrounding the borehole at varying depths by an acoustic tool provides an indication of the depths at which the formation changes. To make an even more accurate determination of the depth at which formation changes occur, the transmission on the casing or drillstring that synchronizes the downhole clock may also indicate that the sonic tool has traveled a predetermined distance, such as 50 or 100 feet. The accurate measurement of changes in the formation's speed of sound by an acoustic tool, and the accurately known depth at which these changes occur, improves the results of vertical seismic profiling. Further, this will provide highly accurate casing and coring point determination. If a density tool is further run in combination, acoustic impedance can be measured directly.

Thus, checkshot data and wellbore sonic data from the sonic tool, and density data, can also be combined to yield optimal synthetic seismograms. These synthetic seismograms may be compared with the surface seismic plots to improve the accuracy, and ensure the quality, of the surface seismic plots. The accuracy of this system allows a sample seismic wavelet to be convolved with data regarding the exact depth of formation changes to yield an example wave-train. In particular, the sample seismic wavelet is convolved with data regarding the reflection coefficients at each underground boundary, based on Snell's law. This generates a synthetic surface seismogram with an accurate reflection pattern that is unavailable in any other way. However, the synthetic surface seismogram contains errors, for example because of the difference in a sonic frequency as contrasted to a seismic frequency. This results in a depth error of about 1–2%. Such errors in the synthetic seismogram pertaining to depth can be corrected for by the checkshot data. Thus, the synthetic wave-rain may be processed with the measured wave-trains to obtain a wave-train that includes only first reflections. Such a wave-train would accurately indicate the location of downhole hazards and formation changes of interest.

Consequently, in addition to transmitting checkshot data to the surface, a representation of the entire received waveform including the portion after the first break may be stored in memory downhole, in either a compressed or uncompressed format. Alternately, this information may be sent uphole while drilling if sufficient data communication rates to the surface can be achieved.

FIGS. 2–7 are experimental results of the present invention. The data were from a series of tests with an actual research prototype made in the HES test well in Fort Worth, Tex.

While preferred embodiments of this invention have been shown and described, modifications thereof can be made by one skilled in the art without departing from the spirit or teaching of this invention. For example, the system can be expanded through the addition of a downhole source to provide signal well imaging while drilling. Other data interpretation techniques used in conjunction with wireline, such as accounting for data migration during seismic surveys, may also be adapted for use with the invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A vertical seismic profiling system, comprising:
   at least one seismic source suitable to position on a surface and suitable to generate a seismic wave;

at least one seismic receiver suitable for placement on a drillstring and suitable to receive said seismic wave and generate to a data signal;

an acoustic tool including at least one acoustic transmitter and at least one acoustic receiver for placement on said drillstring in a formation having a reflector;

wherein said acoustic tool determines a time-of-flight for an acoustic signal between said acoustic transmitter and said acoustic receiver, said time-of-flight indicating a speed of sound;

a clock associated with said seismic receiver; and a processor programmed to determine a distance to said reflector based upon said data signal and said speed of sound.

2. The vertical seismic profiling system of claim 1, wherein said seismic receiver generates a series of said data signals, and said acoustic tool generates a series of said times-of-flight, each of said data signals and said times-of-flight corresponding to a depth in a borehole.

3. The vertical seismic profiling system of claim 2, wherein a sample seismic wavelet is convolved with a transfer function based on said series of data signals and said series of times of flight to obtain an example wave-train.

4. The vertical seismic profiling system of claim 3, further comprising:

a set of seismic receivers positioned on said surface, said set of seismic receivers receiving said seismic wave generated by said seismic source, said received seismic wave including reflections from at least one formation boundary wherein said example wave-train may be used to filter said received seismic wave and obtain first reflections only.

5. The vertical seismic profiling system of claim 1, said clock being subject to clock drift, wherein a synchronization signal is transmitted at a predetermined time to said clock to correct for said clock drift, said synchronization signal being provided by at least one of said drillstring and a casing around said drillstring.

6. The vertical seismic profiling system of claim 5, wherein said synchronization signal additionally indicates when said seismic receiver has traveled a predetermined distance.

7. The vertical seismic profiling system of claim 1, wherein said data signal includes a reflective portion indicating a distance to said reflector.

8. The vertical seismic profiling system of claim 1, wherein said data signal includes a checkshot portion according to the direct travel of said seismic wave to said at least one seismic receiver.

9. The vertical seismic profiling system of claim 8, wherein said acoustic tool determines a plurality of times-of-flights, said plurality of times of flight and said checkshot portion being used by said processor.

10. A method of vertical seismic profiling, comprising:

a. firing a seismic waveform generator to generate a seismic waveform;

b. receiving said seismic waveform at a seismic receiver attached to a drillstring;

c. measuring with an acoustic tool the local interval transit time between an acoustic transmitter and an acoustic receiver; and d. profiling a formation generally ahead of said seismic receiver by processing said seismic waveform using said local internal transit time.

11. The method of claim 10, wherein said profiling includes convolving a sample seismic wavelet with said local interval transit time to obtain an example wave-train.

12. The method of claim 10, further comprising transmitting a synchronization signal through said drill string to a downhole clock, said synchronization signal through said drillstring to a downhole clock, said synchronization signal correcting for drift of said downhole clock.

13. The method of claim 12, wherein said downhole clock travels downhole in a wellbore and said synchronization signal is transmitted upon said downhole clock traveling a predetermined distance.

14. The method of claim 10, further comprising transmitting a synchronization signal through a casing attached to a wellbore wall and to a downhole clock, said synchronization signal including the amount of drift of said downhole clock.

* * * * *

UNITED STATES PATENT AND TRADEMARK OFFICE
CERTIFICATE OF CORRECTION

PATENT NO. : 6,131,694
DATED : October 17, 2000
INVENTOR(S) : Carl A. Robbins, et al.

It is certified that error appears in the above-identified patent and that said Letters Patent is hereby corrected as shown below:

On the title page, item:

[73] Assignee: change "Ahlliburton" to --Halliburton--;

Signed and Sealed this

Eighth Day of May, 2001

Attest:

NICHOLAS P. GODICI

*Attesting Officer*  *Acting Director of the United States Patent and Trademark Office*